(12) United States Patent
Wei

(10) Patent No.: US 7,674,515 B2
(45) Date of Patent: Mar. 9, 2010

(54) FLUORESCENT POLYCARBONATE ARTICLES

(75) Inventor: Guang-Xue Wei, Buffalo Grove, IL (US)

(73) Assignee: Avery Dennison Corporation, Pasadena, CA (US)

(*) Notice: Subject to any disclaimer, the term of this patent is extended or adjusted under 35 U.S.C. 154(b) by 0 days.

(21) Appl. No.: 11/551,786

(22) Filed: Oct. 23, 2006

(65) Prior Publication Data

US 2008/0095987 A1    Apr. 24, 2008

(51) Int. Cl.
B32B 3/00 (2006.01)
B32B 9/00 (2006.01)
B32B 19/00 (2006.01)
B32B 27/36 (2006.01)

(52) U.S. Cl. .............. 428/172; 428/156; 428/412; 428/690; 428/917

(58) Field of Classification Search ............ 428/141, 428/156, 690, 917, 167, 172, 412
See application file for complete search history.

(56) References Cited

U.S. PATENT DOCUMENTS

| | | | |
|---|---|---|---|
| 2,407,680 A | 9/1946 | Palmquist et al. | 88/82 |
| 3,190,178 A | 6/1965 | McKenzie | 88/82 |
| 4,478,769 A | 10/1984 | Pricone et al. | 264/1.6 |
| 4,486,363 A | 12/1984 | Pricone et al. | 264/1.4 |
| 4,601,861 A | 7/1986 | Pricone et al. | 264/1.6 |
| 5,387,458 A | 2/1995 | Pavelka et al. | 428/141 |
| 5,450,235 A | 9/1995 | Smith et al. | 359/529 |
| 5,605,761 A | 2/1997 | Burns et al. | 428/412 |
| 5,614,286 A | 3/1997 | Bacon, Jr. et al. | 428/161 |
| 5,632,946 A | 5/1997 | Bacon, Jr. et al. | 264/212 |
| 5,672,643 A | 9/1997 | Burns et al. | 524/90 |
| 5,691,846 A | 11/1997 | Benson, Jr. et al. | 359/530 |
| 5,754,337 A | 5/1998 | Burns et al. | 359/515 |
| 5,920,429 A | 7/1999 | Burns et al. | 359/515 |
| 5,988,820 A | 11/1999 | Huang et al. | 359/530 |
| 6,318,867 B1 | 11/2001 | Bacon, Jr. et al. | 359/530 |
| 6,350,035 B1 | 2/2002 | Smith et al. | 359/530 |
| 6,508,559 B2 | 1/2003 | Bacon, Jr. et al. | 359/530 |
| 6,514,594 B1 * | 2/2003 | Wei et al. | 428/141 |
| 2002/0126382 A1 | 9/2002 | Smith et al. | 359/530 |
| 2003/0203211 A1 | 10/2003 | Wei et al. | |

OTHER PUBLICATIONS

International Search Report from corresponding International Application No. PCT/US2007/075781 mailed Dec. 27, 2007.

* cited by examiner

*Primary Examiner*—David R Sample
*Assistant Examiner*—Catherine Simone

(57) ABSTRACT

Articles are provided that have fluorescent properties and that are suitable for use in making retroreflective articles such as safety and informational signage. The articles have at least one fluorescent film layer that exhibits excellent overall color durability while also providing chromaticity properties dictated by industry standards for a particular coloration. In a particular application, the articles embody retroreflective properties and are fluorescent yellow-green signs.

14 Claims, 3 Drawing Sheets

FLUORESCENT POLYCARBONATE ARTICLES

This invention relates to polycarbonate articles having fluorescent colorants, and more particularly, to fluorescent polycarbonate articles having excellent color durability without the use of light stabilizers.

BACKGROUND

Articles incorporating fluorescent dyes into polymeric matrices are extensively known in the art for various applications including signage, vehicle markings, roadway markings, and other applications where high visibility is desired and beneficial for any number of reasons, including safety, information dissemination, visibility, visual signaling, and quick detection. The extraordinarily bright appearance of fluorescent materials is what provides this enhanced visibility, which is especially pronounced at dawn and dusk. In some applications, it is important to meet and maintain certain color standards and/or certain durability standards.

Often these polymer systems containing fluorescent colorants are structured in the form of a sheeting that exhibits fluorescing properties. Particularly suitable applications for these types of films loaded with fluorescent colorants are in connection with uses where signaling is a primary function of the article. Traffic safety and informational signs have been known to incorporate films having fluorescent colorants, which enhance visibility of the signs. Certain types of signage need to have long-term outdoor durability.

It is well-known that ultraviolet radiation causes colorants, and in particular, fluorescent colorants, to degrade. When exposed to sunlight or other sources of ultraviolet (UV) light, fluorescent colorants can fade very quickly. This especially creates problems for traffic and roadway signing applications because the rapid fading of the fluorescent color can dramatically shorten the life of the sign. Past efforts to enhance the UV light durability of fluorescent articles, such as retroreflective sheeting, include the use of an UV light screening layer over or in front of a fluorescent layer. Typically, such a UV light screening layer is made by dissolving UV light absorbing compounds into a transparent polymeric matrix and then depositing the screening layer in front of a fluorescent color layer. However, approaches such as these often fail to consider and/or address potential negative interaction between the UV absorber in the screening layer and the fluorescent dye within the underlying colored layer. While UV screening is intended to address the outdoor durability problem, several difficulties can arise. One concern is that the UV light absorbing compounds of these screening layers can leach out with time or can diffuse or migrate into the underlying fluorescent layer. This diffusion can actually accelerate fading of the fluorescent colorant in certain instances. Other methods of enhancing the durability of fluorescent colorants involve using stabilizers of the hindered amine light stabilizer type (HALS type) in combination with the fluorescent colorants in a polymer matrix.

While these methods address the problem of color degradation due to UV light, they do not address the problem of color degradation caused by visible light. Often visible light is more harmful than UV light to fluorescent colorants. Where fluorescent colorants are susceptible to visible light, the use of UV stabilizers and/or UV screening layers will not be effective against color degradation due to visible light.

Other factors that may cause degradation of the fluorescent properties of a fluorescent article include the leaching out of the fluorescent colorant, the light instability of the fluorescent colorant itself and/or negative interactions among the fluorescent colorants, the polymer matrix, additives and/or impurities in the polymer.

SUMMARY

In accordance with the present invention, articles are provided that achieve fluorescent coloration that can be manipulated to realize target coloration requirements while at the same time being light stable, particularly against visible light.

In one embodiment, the invention is directed to an article comprising at least one fluorescent film layer, the film layer comprising a polymeric matrix comprising polycarbonate; and a blend of fluorescent dyes comprising at least one benzoxanthene dye and at least one benzothiazine dye, wherein the article has selected fluorescent coloration. In one embodiment, the selected fluorescent coloration is yellow-green having "x" and "y" chromaticity coordinates bounded by the following coordinates: (x=0.387, y=0.610), (x=0.460, y=0.540), (x=0.421, y=0.486), and (x=0.368, y=0.539).

In another embodiment of the invention there is provided an article exhibiting durable color and/or fluorescent properties comprising: a polymeric matrix comprising polycarbonate, and a blend of fluorescent dyes comprising at least one benzoxanthene dye and at least one benzothiazine dye dispersed within the polymeric matrix, wherein the article exhibits enhanced retention of color and/or fluorescence upon exposure to weathering without the addition of hindered amine light stabilizers or UV absorbers to the polymeric matrix The invention is further directed to a retroreflective sheeting material comprising the fluorescent article described above and having a plurality of retroreflective elements. Such retroreflective sheeting materials find particular utility when used to fabricate retroreflective road signs.

The fluorescent polycarbonate articles of the present invention exhibit enhanced fluorescent and color durability, yet without requiring the use of known UV light screening layers and/or UV light stabilizers incorporated with the articles. Because the UV light screening layer can be eliminated, there are no difficulties with regard to leaching out of UV light absorbers or migration of UV light absorbers from the screening layer, which can actually cause accelerated fading of fluorescent colorants in a polymeric matrix. If an extremely durable fluorescent polycarbonate article is desired, a UV screening layer can be used to protect the polycarbonate resin.

DETAILED DESCRIPTION

Figure 1:
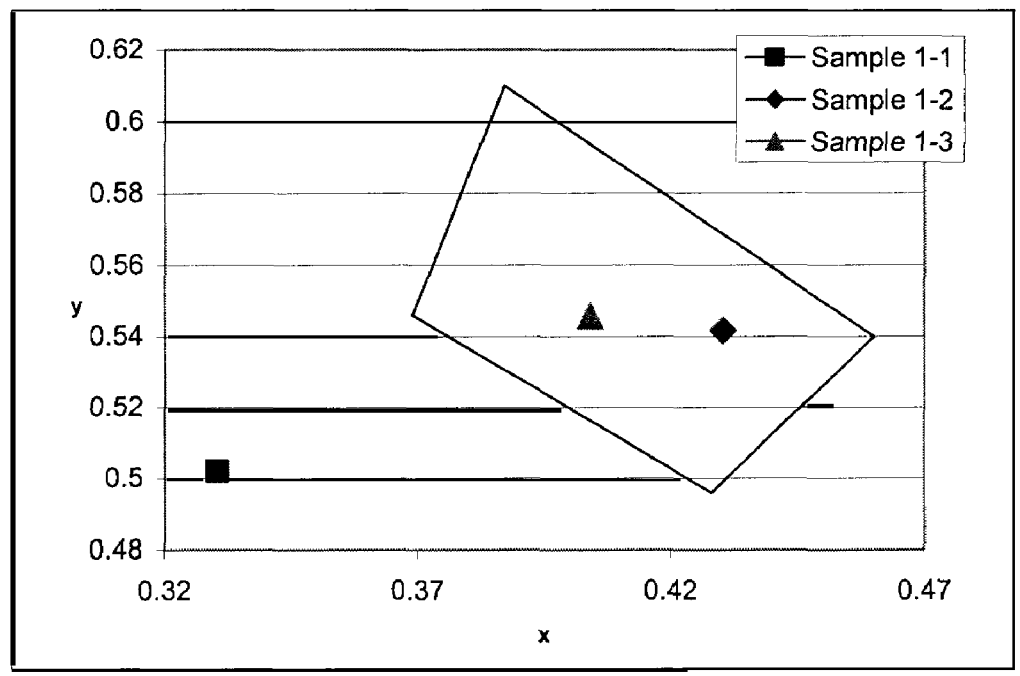
FIG. 1 is a chromaticity diagram defining the area of color space defined as yellow-green.

In accordance with one embodiment of the invention, there is provided a fluorescent article comprising a polymeric matrix comprising polycarbonate in which a blend of a benzothiazine colorant and a benzoxanthene colorant has been thoroughly dispersed.

The polycarbonate component ranges between about 90 and about 99.99 weight percent of the formulation making up the polymer matrix. Each dye is present at a level of between about 0.01 and about 1.5 weight percent of the total weight of the matrix formulation. In one embodiment, each dye is present at a level of between about 0.02 and about 1.0 weight percent. A particularly useful polycarbonate for use as the polymer matrix is bisphenol A polycarbonate, such as Calibre-302 commercially available from Dow Chemical Company.

As the colorant system for the polycarbonate matrix, a blend of two particular types of dyes has been found to be particularly suitable. Dyes of the benzoxanthene type and the benzothiazine type have been found to provide color durability when blended into the polymer matrix. A particularly useful fluorescent benzoxanthene dye is the yellow-green dye available under the trade name "Lumofast Yellow D-150" from DayGlo Corporation.

Dyes of the benzothiazine type have been found to be useful in providing yellow-green fluorescent coloration and chromaticity. A particularly useful benzothiazine dye is Huron Yellow D-417 available from DayGlo Corporation. The combination of this dye with the benzoxanthene yellow-green dye results in coloration and chromaticity values that fall well within the industry standards for yellow-green sheeting.

In one embodiment, the fluorescent coloration of the article provided is fluorescent yellow-green having "x" and "y" chromaticity coordinates that are bounded by the following "x" and "y" coordinates: (x=0.387, y=0.610), (x=0.460, y=0.540), (x=0.421, y=0.486), and (x=0.368, y=0.539).

When included within the polycarbonate matrix, the dye gives excellent daytime luminescence. In one embodiment, the benzoxanthene dye is used in an amount within the range of about 0.01 to about 1.5, or the range of about 0.02 to about 1.0, or the range of about 0.1 to about 1.0 weight percent based upon the total weight of the matrix formulation. In one embodiment, the benzothiazene dye is used in an amount within the range of about 0.01 to about 1.5, or the range of about 0.01 to about 0.5, or the range of about 0.01 to about 0.1 weight percent based upon the total weight of the matrix formulation. The weight loading of the fluorescent dye will depend upon the thickness of the sheet and the desired color intensity for the particular end use. For example, retroreflective articles generally require that the fluorescent dye should be of sufficient transparency such that the retroreflective function of the article is not significantly impaired.

If retroreflective properties are desired, retroreflective elements well-known in the retroreflective sheeting industry, such as microprismatic cube corner elements or glass microspheres, may be designed into the article. For example, in a simple construction, a plurality of microprismatic corner cube elements can be formed directly into the rear surface of the fluorescent layer. When the retroreflective article is fabricated into a road sign, light from the headlights of an oncoming vehicle enters the structure through the front face thereof, passes through to the retroreflective elements, and is retroreflected back to the driver of the vehicle.

The fluorescent polycarbonate article of the present invention, through the proper selection of the fluorescent dyes used in the polycarbonate matrix, have unexpectedly good fluorescence and color durability. It is known, however, that even while fluorescence and color exhibit good durability over extended Xenon arc exposure as well as outdoor exposure, the polycarbonate matrix itself can undergo degradation.

To protect the polycarbonate matrix from such degradation, articles of the invention may optionally include a cover or cap layer. The cap layer may comprise a polymeric matrix that provides abrasion resistance and enhanced weatherability to the polycarbonate matrix. In one embodiment, an acrylate cap layer overlies the fluorescent polycarbonate film. The acrylate cap layer provides protection for the polycarbonate resin from degradation. The cap layer can include a polymer that is itself an absorber of ultraviolet light. A polyarylate matrix is suitable in this regard. A polyarylate resin may be used in combination with a polyacrylate resin to form the cap layer. The cap layer may or may not include light stabilizers.

The fluorescent article may be fabricated by any of the well-known film manufacturing methods such as extrusion, calendaring, or casting. In one embodiment, a method of making a fluorescent retroreflective article is provided wherein the method comprises combining an amount of a polymer matrix comprising polycarbonate with a fluorescent dye blend comprising at least one benzoxanthene dye and at least one benzothiazine dye, and using the polymer matrix with fluorescent dye to manufacture a retroreflective article.

The polymer matrices with the fluorescent yellow-green dye blends can be formed into films suitable for use in the manufacture of retroreflective sheeting. Such films can be incorporated into any of the well-known glass-beaded or microprismatic cube corner retroreflective sheeting structures. A particularly useful embodiment of such sheeting is in the form of microprismatic cube corner retroreflective sheeting. Suitable methods for manufacturing into microprismatic cube corner retroreflective sheeting are disclosed in U.S. Pat. Nos. 4,478,769, 4,486,363, and 4,601,861 assigned to the assignee herein and incorporated herein by reference in their entireties. However, those skilled in the art will recognize that many other methods for manufacture exist. In such embodiments, the yellow-green fluorescent film of the instant invention may be used either alone or with other layers to form a composite retroreflective article. For example, a cap layer can be placed over the front surface of such a sheeting structure.

Figure 2:
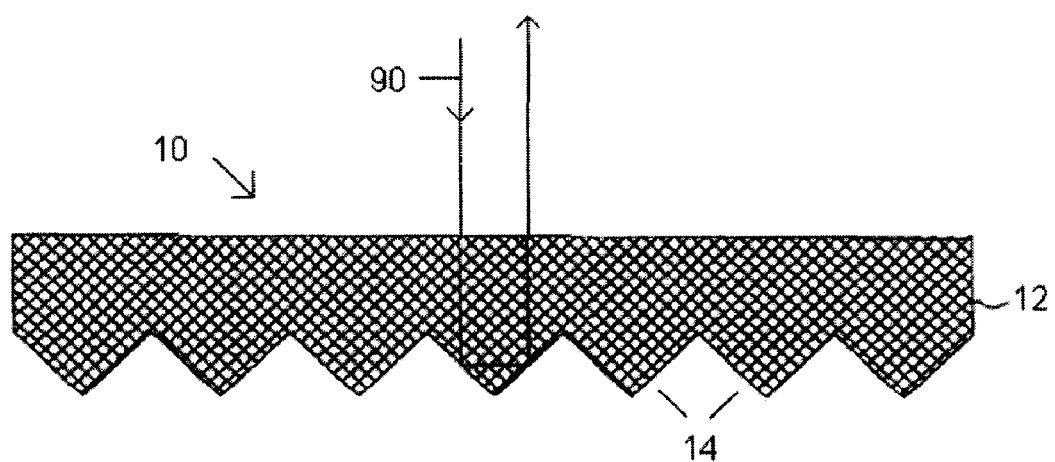
FIG. 2 is a cross-sectional view of an embodiment of a retroreflective sheeting having microprismatic retroreflective elements formed therein.
Figure 3:
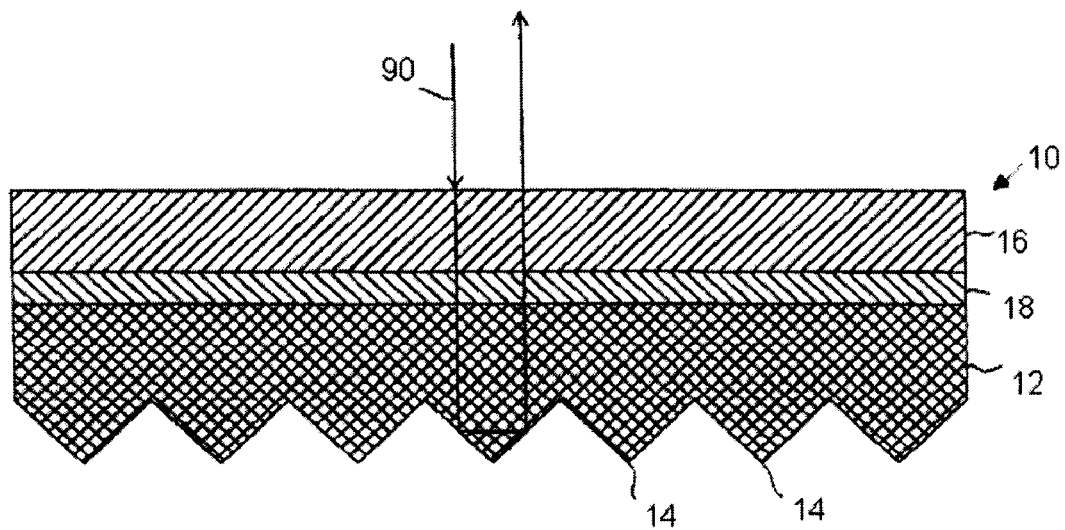
FIG. 3 is a cross-sectional view of an alternative embodiment of a retroreflective sheeting having a cap layer over the fluorescent layer.

FIG. 2 illustrates a cross-sectional view of a retroreflective sheeting 10 made in accordance with the instant invention. Line 90 indicates the path of a light ray entering the front surface of sheeting 10 and being retroreflected thereby. Yellow-green fluorescent color layer 12 has retroreflective cube corner elements 14 formed directly in one surface thereof. Line 90 shows the path of a light ray entering the front surface of sheeting 10 and being retroreflected by cube corner elements 14 back out through the front surface. FIG. 3 illustrates an alternative embodiment wherein an optional cap layer 16 is disposed opposite the surface having cube corner elements 14 formed therein, and optional tie layer 18 is disposed between cap layer 16 and yellow-green fluorescent layer 12.

Figure 4:
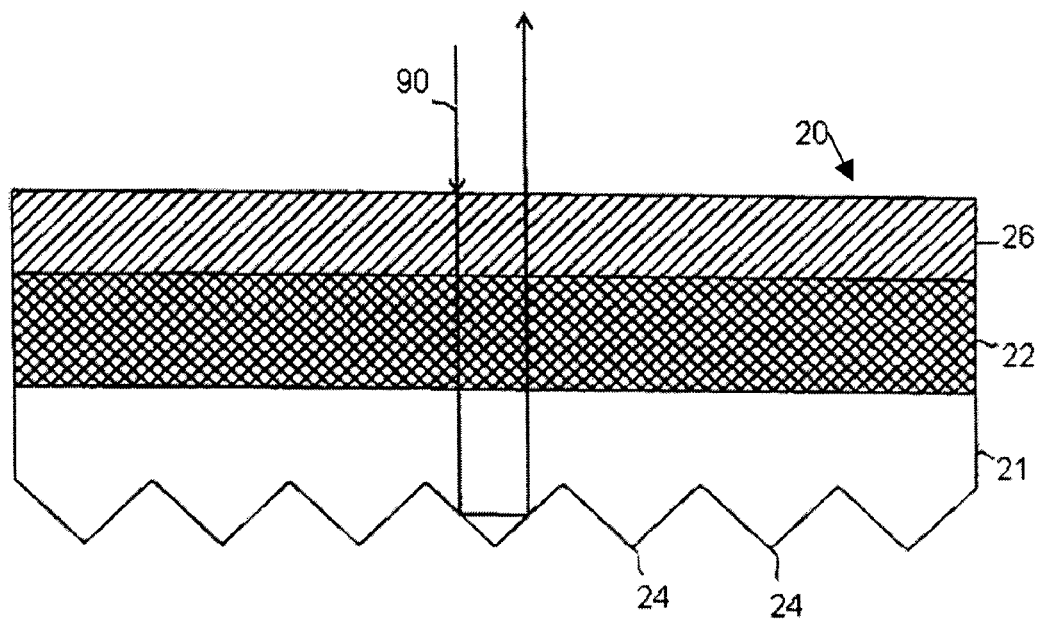
FIG. 4 is a cross-sectional view of an alternative embodiment of a retroreflective sheeting having a colored film layer over clear microprismatic retroreflective elements.

FIG. 4 illustrates a cross-sectional view of an alternative embodiment of a retroreflective sheeting 20 made in accordance with the invention, and in which line 90 indicates the path of a light ray entering the front surface of sheeting 20 and being retroreflected thereby. Retroreflective elements 24 are formed in a surface of film 21, which can be colorless. Yellow-green fluorescent color layer 22 is disposed along the side of film 21 opposite the retroreflective elements. Optional cap layer 26 is disposed over the front surface of yellow-green fluorescent color layer 22. Optional tie layers, not shown, can be disposed between layers 21 and 22, or between layers 22 and 26, or both. Other multi-layer sheeting structures incorporating a fluorescent yellow-green film of the instant invention will be apparent to those skilled in the art. Fluorescent color films of the instant invention also can be used as a face film in the manufacture of retroreflective sheeting in which the retroreflective elements are microspheres, such as enclosed lens retroreflective sheeting as taught in U.S. Pat. No. 2,407,680 (Palmquist), and encapsulated lens retroreflective sheeting as taught in U.S. Pat. No. 3,190,178 (McKenzie).

Figure 5:
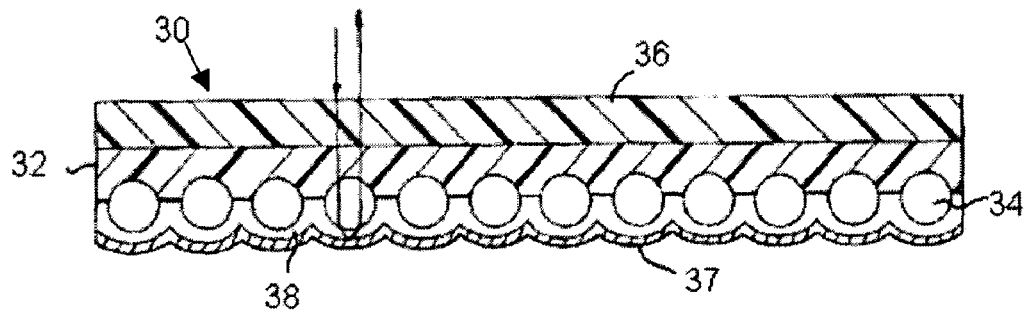
FIG. 5 is a cross-sectional view of an enclosed lens retroreflective sheeting material wherein the fluorescent film layer is disposed over an enclosed lens structure.

FIG. 5 illustrates how the fluorescent film can be incorporated into an enclosed lens retroreflective sheeting article 30. Enclosed lens retroreflective sheeting is well-known in the art, and early teaching in this regard being Palmquist U.S. Pat. No. 2,407,680. This technology can incorporate lenses such as glass microspheres embedded in a sheeting structure with a flat, transparent cover film. In the embodiment of FIG. 5, glass microspheres 34 are embedded in fluorescent layer 32. A specularly reflective layer 37 is provided in accordance with known art; for example, this may be vacuum deposited aluminum. The retroreflective nature of this enclosed lens structure is illustrated by the simplified two-dimensional arrowed light beam path which is shown to pass through the optional cap layer 36, the fluorescent layer 32, into and through the microspheres, into and through the medium 38, and back.

Figure 6:
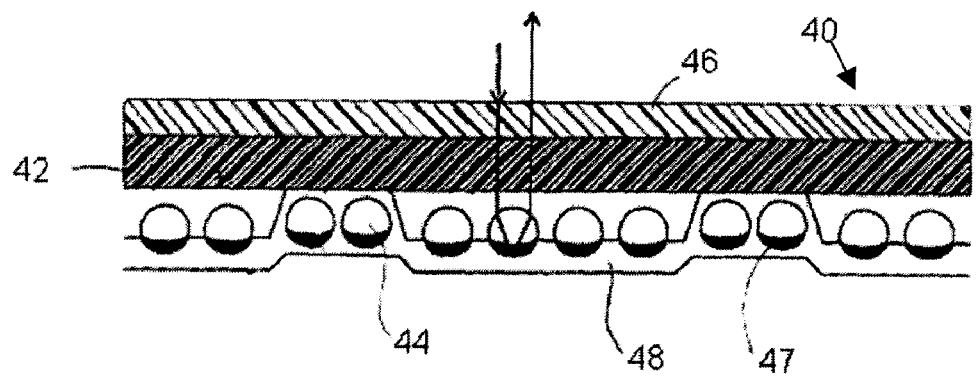
FIG. 6 is a cross-sectional illustration of an encapsulated lens retroreflective sheeting material wherein the fluorescent film layer is disposed over an encapsulated lens structure.

FIG. 6 illustrates how the fluorescent film can be incorporated into an encapsulated lens retroreflective article 40. The encapsulated lens sheeting retroreflective features and structure are well-known in the art. A mono layer of lenses such as glass microspheres is partially embedded in a binder layer, with the film sealed to the binder layer such that the lenses are encapsulated within hermetically sealed cells. In the illustrated embodiment, glass microspheres 44 are embedded in binder layer 48. The fluorescent layer 42 is sealed to the binder layer to hermetically seal the lenses. An optional cap layer 46 may overlie fluorescent layer 42. The illustrated lenses 44 have their own reflective surfaces 47 to provide reflection according to the pattern indicated by the arrowed light path that is shown.

The fluorescent yellow-green retroreflective sheeting of the instant invention can be used in articles such as highway signs, construction work zone barrels or cones, reflective tape, reflective safety garments, road pavement markers, reflective materials for commercial graphics, and the like. Each of these embodiments will comprise a polymer matrix having incorporated therein a yellow-green dye blend of at least one benzoxanthene dye and at least one benzothiazene dye, wherein the dyes are soluble in the polymeric matrix and the resulting fluorescent yellow-green article has chromaticity coordinates falling within the area illustrated in FIG. 1.

The following examples are provided for purposes of illustration only, and are not intended to limit the scope of the invention as defined in the appended claims.

EXAMPLES

The fluorescent article formulations in each of the examples are made using C.W. Brabender Plasti-Corder Prep-Mixer (manufactured by C.W. Brabender Instruments, Inc. of Hackensack, N.J.) through melt mixing of polymer resin and fluorescent colorants, followed by conversion into films of approximately 6 mils using a heated platen press. The mixing temperatures used are in the range of about 245-260° C. The Brabender speed is 100 rpm and the mixing time used is in the range of about 3 to 6 minutes. The converted film is then constructed into retroreflective sheeting by a well-known microreplication process.

After preparing the retroreflective samples, each sample is placed into a Xenon arc accelerated weathering unit and color measurements are routinely measured. The test methodology used for the xenon arc weathering is outlined in ASTM G26-90, Section 1.3.1. Borosilicate inner and outer filters are used, and the irradiance level is set to 0.35 W/m$^2$ at 340 nm. Color measurements are taken on a Hunter Lab LS6000 instrument using a D65 light source, 2° observer, and a 0/45 geometric configuration. To determine the extent of fading and color shifts, the CIE ΔE color difference factor is calculated to compare color measurements after accelerated weathering exposure with initial measurements made prior to weathering. A small value for the CIE ΔE color difference factor indicates small differences in color. A value of about 2 or 3 is barely detectable to the human eye.

Example 1

This example demonstrates that desired fluorescent color can be achieved by blending the two fluorescent dyes with polycarbonate, i.e., benzoxanthene and benzothiazine film. Sample 1-1 is a blend of polycarbonate and 0.2% Lumofast Yellow D150 fluorescent yellow-green dye. Sample 1-2 is a blend of polycarbonate and 0.05% Huron Yellow D-417 and 1.5%. Sample 1-3 is the film of blending polycarbonate, 0.2% Lumofast Yellow D150, and 0.05% Huron Yellow D417. By using a well-known embossing technique, the above raw films are converted into retroreflective road sign sheeting. Through embossing process, a plurality of microprismatic corner cube elements is formed directly into the rear surface of the fluorescent film. Then, a finished retroreflective sheeting is made by laminating a white backing film on the embossed film. The resulting chromaticity coordinates and total luminescence factor Y (%) for the individual films are shown in Table I and FIG. 1.

TABLE I

| Sample | Fluorescent Dye in Polycarbonate | UVA | x | y | Y |
|---|---|---|---|---|---|
| 1-1 | D-150 | no | 0.3304 | 0.5021 | 80.15 |
| 1-2 | D-417 | yes | 0.4302 | 0.5417 | 83.90 |
| 1-3 | D-150 and D-417 | no | 0.4041 | 0.5458 | 83.83 |

The results in Table I and FIG. 1 illustrate that the total luminescence (Y) and chromaticity of the retroreflective sheeting made from polycarbonate blending with two fluorescent dyes, i.e., polycarbonate/benzoxanthene/benzothiazine film, can be adjusted to desired position inside the color space. The results also show that the blend of polycarbonate with the benzoxanthene dye (Lumofast D-150) would not be suitable by itself to achieve a fluorescent yellow-green retroreflective sheeting with the desired total luminescence (Y) and color.

Example 2

This example demonstrates the durability of polycarbonate with the fluorescent dye blend. Sample 2-1 is the blend of polycarbonate and 0.06% Huron D-417. Sample 2-2 is the blend of polycarbonate, 0.2% Lumofast Yellow D150, and 0.05% Huron Yellow D417. To protect the polycarbonate from degradation, a clear acrylic film is used on the top of colored polycarbonate. The accelerated weathering results are shown in Table II.

TABLE II

| Sample | Dye | ΔE of Sample Exposed at Indicated Period of Time (hours) | | | | | | |
|---|---|---|---|---|---|---|---|---|
| | | 500 | 1000 | 1500 | 2000 | 3000 | 4000 | 5000 |
| 2-1 | D-417 | 2.55 | 9.89 | 12.26 | — | — | — | — |
| 2-2 | D-417 and D-150 | 0.79 | 4.05 | 4.60 | 8.54 | 9.81 | 10.87 | 13.18 |

The results in Table II illustrate that the fluorescent yellow-green polycarbonate made of polycarbonate with the fluorescent dye blend has dramatically improved durability of fluorescent properties over that of the single dye D-417.

While the invention has been explained in relation to embodiments, it is to be understood that various modifications thereof will become apparent to those skilled in the art upon reading the specification. Therefore, it is to be understood that the inventions disclosed herein are intended to cover such modifications as fall within the scope of the appended claims, and to cover insubstantial variations thereof.

What is claimed is:

1. An article comprising at least one fluorescent film layer, without the addition of hindered amine light stabilizers or UV absorbers or UV light screening layers, the film layer comprising a polymeric matrix comprising poly carbonate ranging from about 90 to about 99.99 weight percent of the polymeric matrix; and a blend of fluorescent dyes comprising about 0.01% to about 1.5% by weight, based on the weight of the polymeric matrix, of at least one benzoxanthene dye and about 0.01% to about 1.5% by weight of at least one benzothiazine dye, wherein the article has selected fluorescent coloration, wherein the selected fluorescent coloration is fluorescent yellow-green having "x" and "y" chromaticity coordinates bounded by the following coordinates: (x=0.387, y=0.610), (x=0.460, y=0.540), (x=0.421, y=0.486), and (x=0.368, y=0.539) and wherein the article exhibits enhanced retention of fluorescent coloration upon exposure to weathering.

2. The article of claim 1 wherein the at least one film layer has a plurality of retroreflective elements disposed on a surface thereof.

3. The article of claim 1 further comprising a second layer, the second layer having a plurality of retroreflective elements on a surface thereof.

4. The article of claim 2 wherein the retroreflective elements are microprismatic elements.

5. The article of claim 2 wherein the retroreflective elements are arranged to provide an encapsulated lens retroreflective construction.

6. The article of claim 2 wherein the retroreflective elements are arranged to provide an enclosed lens construction.

7. The article of claim 3 wherein the retroreflective elements are microprismatic elements.

8. The article of claim 3 wherein the retroreflective elements are arranged to provide an encapsulated lens retroreflective construction.

9. The article of claim 3 wherein the retroreflective elements are arranged to provide an enclosed lens construction.

10. The article of claim 2 wherein the article is signage suitable for outdoor use.

11. The article of claim 1 further comprising a cap layer polymeric film overlying the fluorescent film layer, the cap layer comprising an acrylic resin, a polyarylate resin, or combinations thereof.

12. A fluorescent yellow-green retroreflective article comprising at least one film layer, without the addition of hindered amine light stabilizers or UV absorbers or UV light screening layers the film layer comprising:
a polymer matrix comprising polycarbonate ranging from about 90 to about 99.99 weight percent of the polymeric matrix; and
a fluorescent dye blend comprising about 0.01% to about 1.5% by weight, based on the weight of the polymeric matrix, of at least one benzoxanthene dye and about 0.01% to about 1.5% by weight of at least one benzothiazine dye, wherein the fluorescent yellow-green has "x" and "y" chromaticity coordinates bounded by the following coordinates: (x=0.387, y=0.610), (x=0.460, y=0.540), (x=0.421, y=0.486), and (x=0.368, y=0.539) and wherein the article exhibits enhanced retention of fluorescent coloration upon exposure to weathering.

13. The article of claim 12 wherein the at least one film layer has a plurality of retroreflective elements disposed on a surface thereof.

14. An article exhibiting durable color and/or fluorescent properties comprising:
a polymeric matrix without the addition of hindered amine light stabilizers or UV light screening layers or UV light stabilizers comprising polycarbonate ranging from about 90 to about 99.99 weight percent of the polymeric matrix;
an acrylic cap layer overlies the polycarbonate film;
a blend of fluorescent dyes comprising about 0.01% to about 1.5% by weight, based on the weight of the polymeric matrix, of at least one benzoxanthene dye and about 0.01% to about 1.5% by weight of at least one benzothiazine dye dispersed within the polymeric matrix;
wherein the article is fluorescent yellow-green having "x" and "y" chromaticity coordinates bounded by the following coordinates: (x=0.387, y=0.610), (x=0.460, y=0.540), (x=0.421, y=0.486), and (x=0.368, y=0.539) and the article exhibits enhanced retention of fluorescent coloration upon exposure to weathering.

* * * * *